(12) United States Patent
Vizzini et al.

(10) Patent No.: US 11,465,534 B2
(45) Date of Patent: Oct. 11, 2022

(54) METHOD AND SYSTEM FOR PREDICTIVE BATTERY THERMAL MANAGEMENT IN AN ELECTRIC VEHICLE

(71) Applicant: Volvo Car Corporation, Gothenburg (SE)

(72) Inventors: Simone Vizzini, Gothenburg (SE); Björn Fridholm, Gothenburg (SE); Leonardo Claudio Amato, Savedalen (SE); Fabio Delgado, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 269 days.

(21) Appl. No.: 16/901,284

(22) Filed: Jun. 15, 2020

(65) Prior Publication Data

US 2021/0031654 A1 Feb. 4, 2021

(30) Foreign Application Priority Data

Jul. 30, 2019 (EP) .................................... 19189063

(51) Int. Cl.
*H01M 10/613* (2014.01)
*B60L 58/12* (2019.01)
(Continued)

(52) U.S. Cl.
CPC .............. *B60L 58/26* (2019.02); *B60L 50/60* (2019.02); *B60L 58/12* (2019.02); *B60L 58/16* (2019.02);
(Continued)

(58) Field of Classification Search
CPC .......... B60L 58/26; B60L 50/60; B60L 58/12; B60L 58/16; H01M 10/613;
(Continued)

(56) References Cited

U.S. PATENT DOCUMENTS 9,222,380 B2 * 12/2015 Persson ........... B60W 30/18054
9,522,669 B2 * 12/2016 Engman ............. G01C 21/3484
(Continued)

FOREIGN PATENT DOCUMENTS

WO        201577210 A1    11/2015
WO    WO 2015/177210    * 11/2015
(Continued)

OTHER PUBLICATIONS

Oct. 2, 2019 European Search Report issue on International Application No. EP19189063.
(Continued)

*Primary Examiner* — Alexander Usyatinsky
(74) *Attorney, Agent, or Firm* — Clements Bernard Walker; Christopher L. Bernard

(57) ABSTRACT

A method for controlling cooling of a traction battery in an electric vehicle where the method comprises determining a battery temperature profile for a segment of a planned route based on route information describing a route from a starting point to a destination and based on a current battery status and determining a battery cooling profile for the segment of the route based on the battery temperature profile. By means of the route information and the state of the battery, the battery cooling profile can be determined in order to minimize the power required for cooling the battery. Since the route information can provide information relating to a range of parameters which influence the power consumption along the route, the cooling needs of the battery can also be estimated for the route as a whole.

19 Claims, 4 Drawing Sheets

(51) Int. Cl.
*B60L 58/26* (2019.01)
*H01M 10/625* (2014.01)
*H01M 10/633* (2014.01)
*B60L 50/60* (2019.01)
*B60L 58/16* (2019.01)
*B60K 1/02* (2006.01)
*B60K 17/356* (2006.01)

(52) U.S. Cl.
CPC ....... H01M 10/613 (2015.04); H01M 10/625 (2015.04); H01M 10/633 (2015.04); *B60K 1/02* (2013.01); *B60K 17/356* (2013.01); *H01M 2220/20* (2013.01)

(58) Field of Classification Search
CPC ............. H01M 10/625; H01M 10/633; H01M 2220/20; B60K 1/02; B60K 17/356
See application file for complete search history.

(56) References Cited

U.S. PATENT DOCUMENTS

| | | | | |
|---|---|---|---|---|
| 2012/0316712 | A1* | 12/2012 | Simonini | H01M 10/625 701/22 |
| 2015/0100188 | A1* | 4/2015 | Wagner | B60L 58/24 903/903 |
| 2015/0360550 | A1* | 12/2015 | Berger | B60L 58/26 180/68.4 |
| 2016/0059733 | A1 | 3/2016 | Hettrich et al. | |
| 2020/0055406 | A1* | 2/2020 | Vallender | B60L 58/27 |
| 2020/0328656 | A1* | 10/2020 | Mcbride | H02K 7/108 |

FOREIGN PATENT DOCUMENTS

| | | | |
|---|---|---|---|
| WO | 2016083529 | A1 | 6/2016 |
| WO | WO2016/083529 | * | 6/2016 |

OTHER PUBLICATIONS

Zhu et al., "A Real-Time Battery Thermal Management Strategy for Connected and Automated Hybrid Electric Vehicles (CAHEVs) Based on Iterative Dynamic Programming", IEEE Transactions on Vehicular Technology, vol. 67, No. 9, Sep. 9, 2018.

Amini et al., Two-Layer Model Predictive Battery Thermal and Energy Management Optimization for Connected and Automated Electric Vehicles, 57th IEEE, Conference on Decision and Control (CDC), Dec. 17-19, 2018.

* cited by examiner

METHOD AND SYSTEM FOR PREDICTIVE BATTERY THERMAL MANAGEMENT IN AN ELECTRIC VEHICLE

CROSS-REFERENCE TO RELATED APPLICATION

The present disclosure claims the benefit of priority of co-pending European Patent Application No. 19189063.1, filed on Jul. 30, 2019, and entitled "METHOD AND SYSTEM FOR PREDICTIVE BATTERY THERMAL MANAGEMENT IN AN ELECTRIC VEHICLE," the contents of which are incorporated in full by reference herein.

TECHNICAL FIELD

The present disclosure relates to a method and system for predictive battery thermal management in an electric vehicle.

BACKGROUND

Propulsion technologies for vehicles are evolving to reduce the dependence on fossil fuels, and a promising alternative to internal combustion engines are electric drive systems. To facilitate a large scale introduction of vehicles comprising electric drive systems, there is a need to develop electric drive systems which are both fuel energy efficient and cost competitive.

A fully electric vehicle requires a relatively large propulsion battery which will generate heat as power is drawn from the battery. To avoid overheating of the battery, battery thermal management (BTM) systems are employed. A traditional battery thermal management system for cooling a propulsion battery in an electric vehicle may attempt to maintain the battery temperature at a specified level, without considering parameters external to the battery.

Since the battery temperature can increase rapidly due to aggressive vehicle acceleration and deceleration and the BTM system has limited bandwidth to respond, the desired battery temperature setpoint is usually selected well below the upper limit of the optimum operation range to assure that the temperature stays within the limit during transients.

However, since a cooling system in a battery thermal management system requires power which is also drawn from the battery, it is desirable to minimize the power consumption of battery thermal management system. A reduced power consumption for cooling also leads to an increased range of the vehicle. It is therefore desirable to provide further improved and refined battery thermal management systems in electric vehicles.

SUMMARY

In general, the disclosed subject matter relates to a method for controlling cooling of a traction battery in an electric vehicle where the method comprises determining a battery temperature profile for a segment of a planned route based on route information describing a route from a starting point to a destination and based on a current battery status and determining a battery cooling profile for the segment of the route based on the battery temperature profile. By means of the route information and the state of the battery, the battery cooling profile can be determined in order to minimize the power required for cooling the battery. Since the route information can provide information relating to a range of parameters which influence the power consumption along the route, the cooling needs of the battery can also be estimated for the route as a whole. This means that it is possible to employ the cooling system only when the predicted route as planned or specific segments within the route would lead to an overheated battery. Accordingly, it is possible to operate the battery at temperatures closer to an upper temperature limit, i.e. to reduce cooling, if it is predicted that the battery will remain within the required temperature range for the predetermined route.

In one embodiment of the invention, the battery cooling profile is optimized with an aim to minimize the power required for cooling the battery for the planned route. Such optimization may comprise detecting a cooling region in the battery temperature profile where the battery temperature is decreasing without actively cooling the battery; and configuring the battery cooling profile so that the battery temperature is at a predetermined temperature value when reaching the cooling region. Accordingly, if it is known beforehand that the battery will naturally cool down for a certain part of the route (i.e. cool down without using the cooling system), the battery can be allowed to reach a higher temperature in a part of the route preceding the part where it will naturally cool down, thereby reducing the power consumption of the battery thermal management system.

The present invention also relates to a battery thermal management system comprising a control unit configured to employ the described method, and to a vehicle comprising such a system.

BRIEF DESCRIPTION OF THE DRAWINGS

These and other aspects of the present invention will now be described in more detail with reference to the appended drawings showing example embodiments of the invention, wherein.

DETAILED DESCRIPTION

Figure 1:
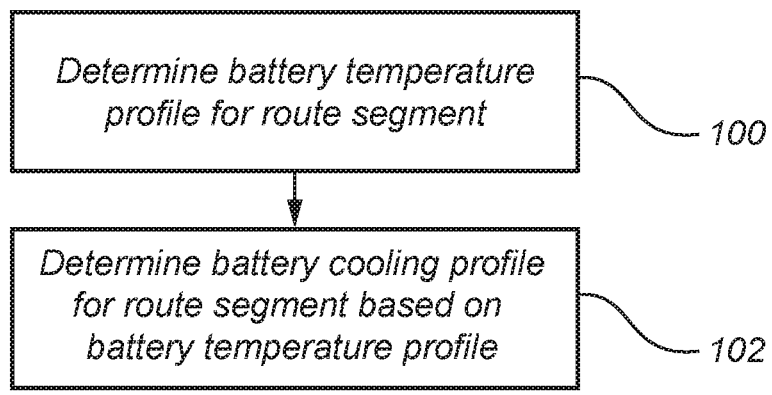
FIG. 1 is a flow chart outlining general steps of a method according to an embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Figure 2:
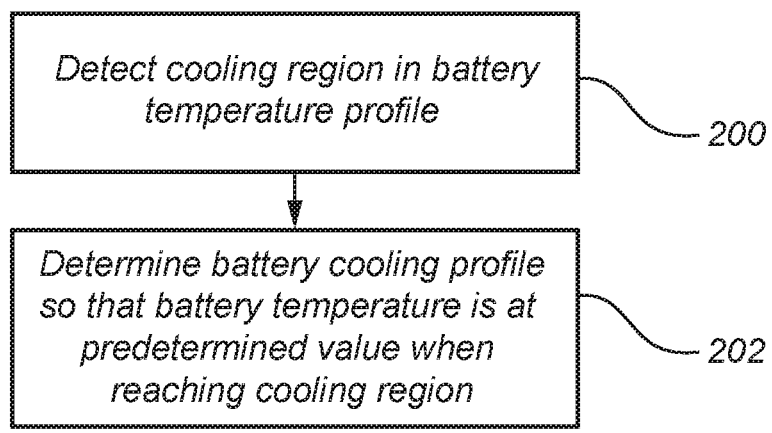
FIG. 2 is a flow chart outlining general steps of a method according to an embodiment of the invention.

FIGS. 1 and 2 are flow charts outlining the general steps of methods for controlling cooling of a traction battery in an electric vehicle according to embodiments of the invention. The method can be assumed to be performed by a battery cooling control unit in a battery thermal management system of the vehicle and will be described with further reference to FIG. 3 illustrating a route 300 along which a vehicle may travel and where the method may be employed.

Figure 3:
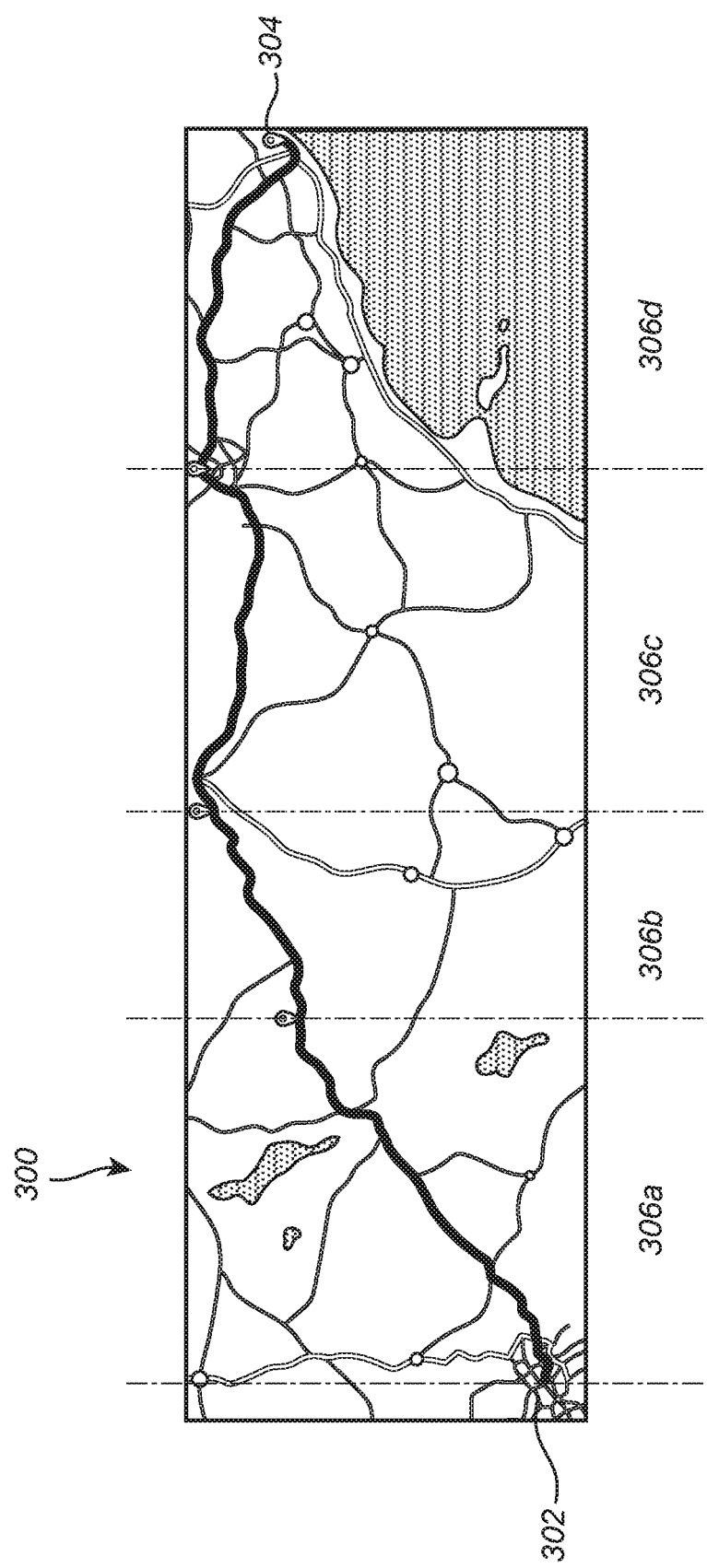
FIG. 3 is a schematic illustration of a route where a method according to embodiments of the invention may be implemented.

The method disclosed by FIG. 1 and further illustrated by FIG. 3 comprises determining 100 a battery temperature profile for a segment 306a-d of a planned route 300 based on route information describing a route 300 from a starting point 302 to a destination 304 and based on a current battery status; and determining 102 a battery cooling profile for the segment 306a-d of the planned route based on the battery temperature profile.

Figure 4:
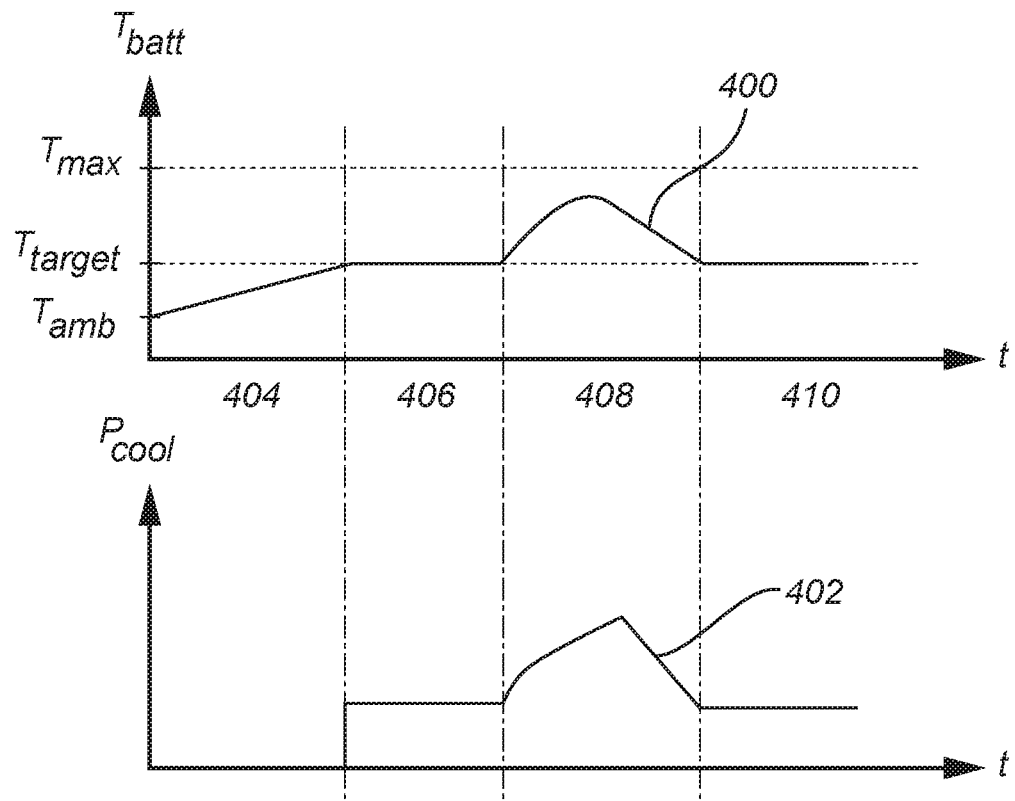
FIG. 4 schematically illustrates a battery temperature profile and a battery cooling profile according embodiments of the invention.

FIG. 4 illustrates a schematic example of a battery temperature profile 400, $T_{batt}$, and of a battery cooling profile 402, where the battery cooling profile is represented by a power, $P_{cool}$, provided to the battery cooling system. The illustrated battery temperature profile 400 and battery cooling profile 402 can be considered to represent one segment of the route.

The route information used as a basis for determining the battery temperature profile first comprises the starting point 302 and destination 304 of the route 300 as illustrated by FIG. 3, thereby giving the travel distance. Moreover, the route information may comprise any or all of: speed limits, road type, road elevation profile, construction work, traffic flow, weather information or any other parameter that may influence the battery power consumption and thereby the battery temperature profile. It should be noted that the embodiments described herein are not limited to one specific model for determining a battery temperature profile, and that many different models may be used. Which model to be used may in part depend on what information is available. The model may also be an adaptable model which uses the available information to determine a battery temperature profile with the best possible accuracy given the available information. The amount of information and the accuracy of the model may also dictate the maximum extent of a prediction window, i.e. for how long distance and/or time the battery temperature can be predicted with sufficient accuracy, thereby determining the length of the segment. The prediction window also depends on the route information, where the battery temperature profile for example is more easily predictable for a road portion with a fixed speed limit and low traffic compared to for a road with varying speed limits and high traffic density. Thereby, the length of a segment may be based on speed limits of roads of the route.

Accordingly, depending on the amount of information available and the nature of the model, the prediction window and thereby the length of the segment may vary. If the prediction window is longer than or equal to the length of a suggested segment, a battery cooling profile can be determined for the entire segment but if the prediction window is shorter than a suggested segment, the length of the segment may be limited to the length of the prediction window. The method may thus comprise determining a battery temperature profile and a battery cooling profile for a plurality of segments, thereby making it possible to determining the battery cooling profile for an entire route.

Route information can for example be acquired from an online or offline navigation system of the vehicle. Route information may also be acquired from a remote server or a cloud environment using a wireless connection of the vehicle. Furthermore, certain route information may be provided by the driver of the vehicle. In addition to the destination which is typically determined by the driver, the driver may also provide information describing planned stops along the route. The planned stop may for example be a planned lunch break or other stops. If the route comprises a planned stop, the driver may also define the planned stop as a charging stop where the vehicle will be charged for a specified time period. It is also possible that the driver defines a planned stop and that the vehicle control system determines if the location where the stop is planned has charging capabilities. Information of possible charging locations may be stored locally in the vehicle or available online and may be used when determining the battery cooling profile.

The method may also comprise suggesting a suitable location for a charging stop if the driver requests one or more stops along the route. Thereby, the battery temperature profile and resulting battery cooling profile can be determined based on information of the planned stops and the length of the segments may be based on locations of charging stations along the route.

The battery status preferably comprises determining a state-of-charge (SoC) and state-of-health (SoH) of the battery, since both SoC and SoH influences the temperature characteristics of the battery and thereby the cooling needs. In general, at low SoC and for decreasing SoC the internal resistance of the battery increases. The increase in internal resistance in turn leads to higher thermal losses an subsequently to the need for increased cooling.

In particular, the route information combined with the SoC provides an indication of whether the battery will need to be recharged during the route or if it is possible to travel the entire route without making a charging stop. During a charging stop, the battery will be cooled down naturally and the battery may also be cooled by a battery cooling system using power from the grid, thereby reducing the power that needs to be supplied by the vehicle for cooling the battery. The charging stop may thus be a stop requested by the driver or a necessary stop for charging the battery. In both cases, the battery cooling profile can be determined taking the planned stop into account.

Preferably, the battery cooling profile is determined to minimize the power required for cooling the battery for the planned route. This can be done by taking the described route information and battery status into account so that the battery is not being cooled when there is no need based on the determined battery temperature profile.

The battery temperature profile 400 of FIG. 4 further illustrates an ambient temperature $T_{amb}$, a target temperature $T_{target}$, and a maximum allowable temperature $T_{max}$. If the battery temperature, $T_{batt}$, is below the target temperature as is illustrated in the first region 404 of FIG. 4, it is deemed that no cooling of the battery is required. Once the battery reaches the target temperature, cooling of the battery may be required depending on how the temperature profile would develop without cooling. Here, a determination is made as to whether the battery temperature would reach the maximum allowable temperature if no cooling is provided. In the illustrated example, battery cooling is activated as illustrated by the battery cooling profile 402 in the second region 406.

The amount of cooling provided to the battery may for example be controlled by controlling the coolant flow in the battery cooling system or by controlling other parameters in the battery cooling system.

The third region 408 of FIG. 4 illustrates an increase in battery temperature which requires an increase in battery cooling power to prevent the battery temperature from reaching the maximum allowable temperature. The temperature increase may for example be the result of an increased speed or of an uphill climb. In the following fourth region 410, there battery cooling need is reduced. The maximum allowable temperature is preferably determined so that there is a margin to a critical operating temperature for the battery which cannot be exceeded. The maximum allowable temperature may for example be set so that it is possible to keep the battery from reaching a critical battery temperature if the battery temperature is at the maximum allowable temperature and a maximum power is unexpectedly drawn from the battery.

In example embodiments of the invention, the target temperature may be ~30° C. and the maximum allowable temperature may be ~50° C. As mentioned earlier, both $T_{target}$ and $T_{max}$ may vary depending on the status of the battery (e.g. SoC and SoH), and it is also possible to vary $T_{target}$ and $T_{max}$ during the route if the status of the battery changes. The battery cooling control system may further comprise intermediate temperature levels determining the prioritization of the battery cooling system. As an example, there may be an intermediate threshold temperature between $T_{target}$ and $T_{max}$, and if the battery temperature exceeds the intermediate threshold temperature, the battery cooling system is prioritized over other subsystems of the vehicle that require cooling, whereas if the battery temperature is below the intermediate threshold temperature, it may operate at normal or low priority.

Figure 5:
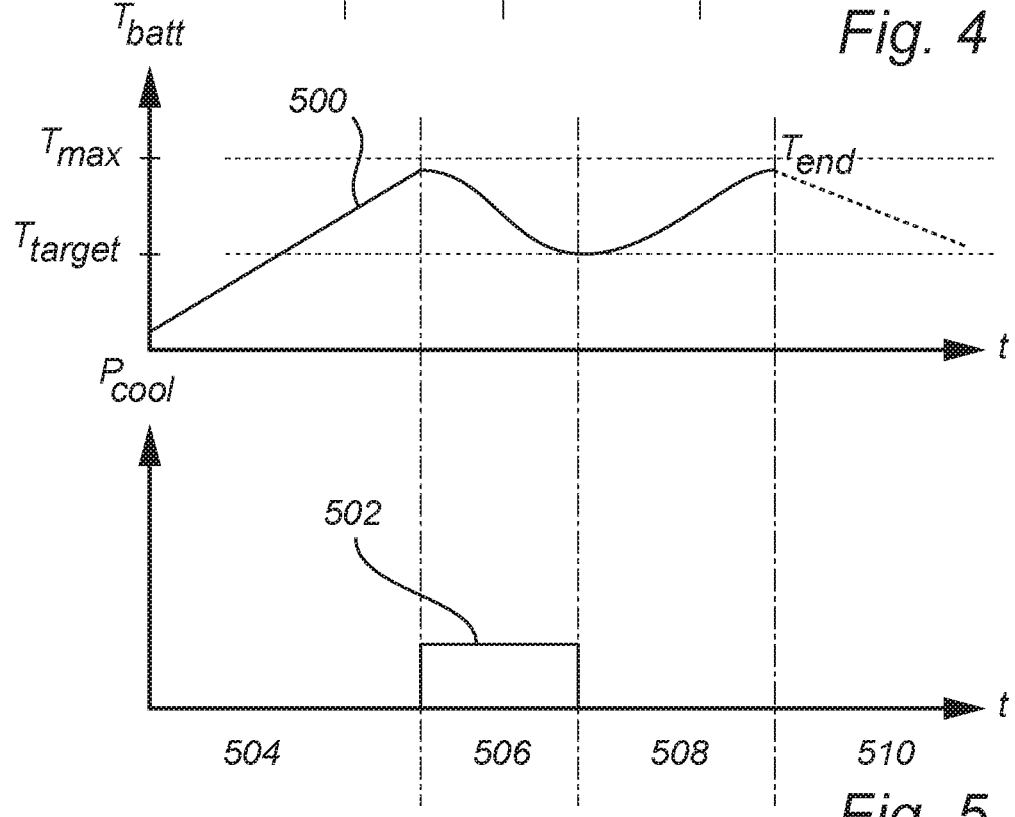
FIG. 5 schematically illustrates a battery temperature profile and a battery cooling profile according embodiments of the invention.

The method described by the flow chart of FIG. 2 and further illustrated by FIG. 5 comprises: detecting 200 a cooling region 510 in the battery temperature profile 500 where the battery temperature is decreasing without actively cooling the battery; and determining 202 the battery cooling profile 500 so that the battery temperature is at a predetermined temperature value when reaching the cooling region. The predetermined temperature value, $T_{end}$, is higher than the target battery temperature and lower than the maximum allowable battery temperature.

In order to minimize the power consumption of a battery cooling system, the described method comprises identifying regions in the battery temperature profile where the temperature of the battery is reduced without actively cooling the battery, and reducing or elimination active cooling in regions leading up to the cooling region. Such cooling regions may arise when the vehicle is at a stop such as a planned break, a charging stop or the like. Regions of natural cooling may also occur as a result of slow traffic or traffic jams, bridge openings, train crossings, long descents etc which can be part of the route information used to determine the battery temperature profile.

As illustrated in FIG. 5, the first region 504 illustrates a rising temperature triggering a need for active cooling to reduce the battery temperature as illustrated in the second region 506. However, in the next region 508, even though the battery temperature increases, no power is provided to the cooling system since it is known that the third region 508 with rising temperature will be followed by a fourth region 510 where the battery temperature is naturally decreasing, i.e. a cooling region. Accordingly, the battery cooling system is controlled so that the battery is at a temperature $T_{end}$ which is higher than the target temperature by lower than or equal to the maximum allowable temperature $T_{max}$ when reaching the cooling region 510 Thereby, the overall power consumption of the battery cooling system can be minimize by predicting regions of natural cooling and by adapting the battery cooling profile based on such regions.

The method may also comprise determining a battery current profile based on the route information and the battery status. Based on the route information, a power need for propulsion can be predicted which in turn can be translated to a current drawn from the battery. The model used for determining the battery temperature profile may also contain stored information or models describing the relation between the required propulsive power and a resulting battery temperature. Moreover, the effects of regeneration currents from regenerative braking are preferably taken into account when determining the battery cooling profile.

The method may also comprise determining the battery cooling profile for the planned route at least partially based on a previously measured battery temperature profile for the same route. For each travelled route, the battery cooling management system may store the battery temperature profile and the battery cooling profile along with a measured battery temperature profile and an actual, real, battery cooling profile. Accordingly, if a route is entered into the navigation system which has been travelled before, the determined battery cooling profile can be based on previous knowledge of the same route. The method may also comprise compensating for a difference in one or more parameters compared to the stored information, such as a different ambient temperature, traffic situation etc. Thereby, the cooling management system can learn the optimal cooling properties for a specific repeated route which may be very advantageous for example for commutes which are often repeated.

According to one embodiment of the invention, the method further comprises detecting a deviation from the planned route and updating the battery cooling profile based on the detected deviation. If the driver takes a detour from the predicted route, the battery thermal management system may update the battery cooling profile based on a partially or wholly new route. Moreover, if the driver returns to the previously planned route, the previously existing battery cooling profile may be used. If the driver deviates from the planned route and if the battery thermal management system has no knowledge of the destination, it may operate according to a standard cooling scheme controlling the battery to be at a target temperature.

Moreover, the method may further comprise, determining a new battery temperature profile for the current segment if a measured battery temperature deviates from an expected battery temperature based on the battery temperature profile by more than a predetermined difference value. The cooling system control unit may comprise an algorithm operating in the background, e.g. an online estimator, which is capable of recalculating the battery cooling profile if the input parameters change from what was used to determine the original battery cooling profile.

When determining the battery temperature profile and the battery cooling profile, the method can include assuming that the vehicle is driven at the speed limit, for example by an automatic cruise control system, or that the vehicle is operated in a semi- or fully autonomous autopilot mode. Moreover, it can be assumed that the driver follows instructions from the system relating to e.g. charging stops and the like.

Figure 6:
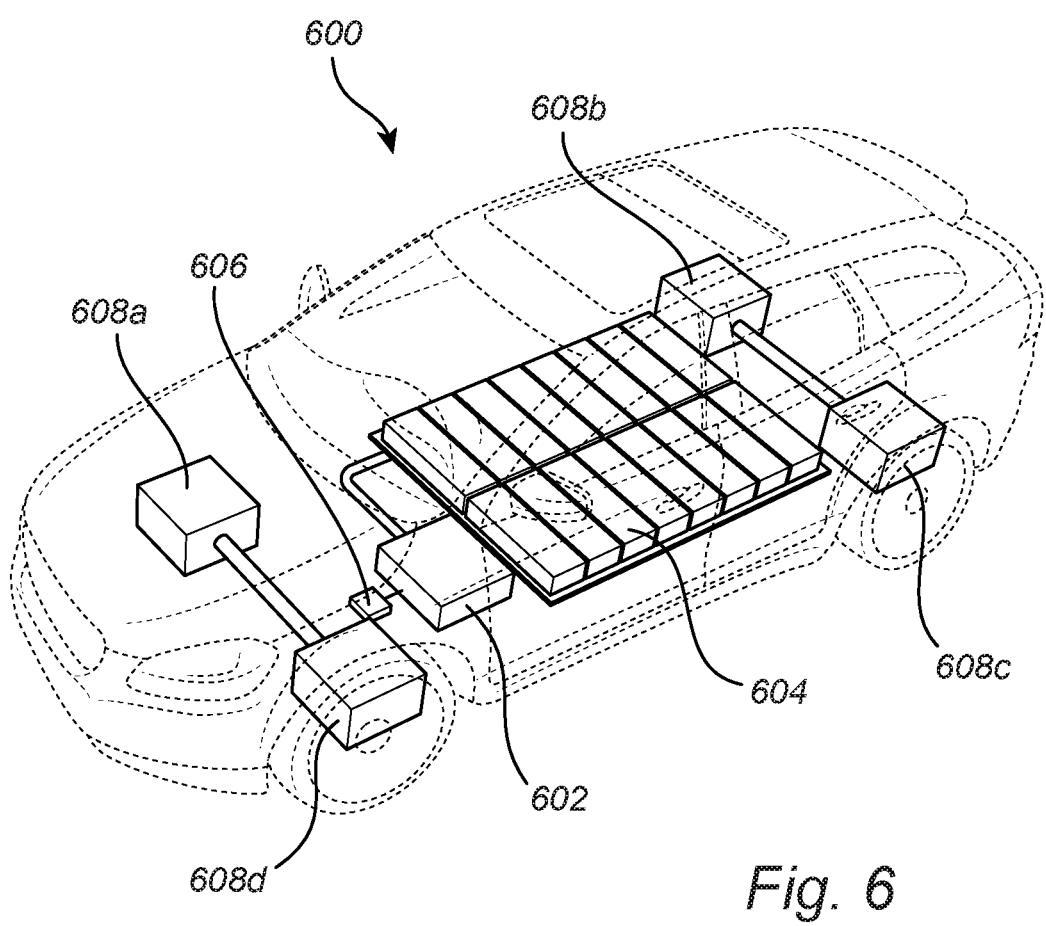
FIG. 6 schematically illustrates a vehicle comprising a system according to an embodiment of the invention.

FIG. 6 schematically illustrates a vehicle 600 comprising a battery thermal management system 601 according to an embodiment of the invention. The battery thermal management system 601 comprises a battery cooling system 602 arranged and configured to cool a traction battery 604 of an electric vehicle 600 and a battery thermal management system control unit 606 configured to determine a battery temperature profile for a planned route based on route information describing a route from a starting point to a destination and based on a current battery status; and determine a battery cooling profile for the route based on the battery temperature profile.

The vehicle is illustrated with four electrical machines 608a-d, one connected to each wheel of the vehicle. It should however be noted that the described method and system is applicable for any type of configuration of an electric propulsion system comprising one or more electric machines for vehicle propulsion. For example, the vehicle may be equipped with a rear and/or front axle comprising only one electric machine each for two- or four-wheel drive.

The control unit 606 may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Moreover, the control unit 606 may be a dedicated control unit for controlling the battery thermal management system and for performing the methods according to various embodiments of the invention, but it is also possible that the described functionalities of the control unit 606 are provided by a general-purpose control unit or that the functionalities are distributed over several different control units.

Even though the invention has been described with reference to specific exemplifying embodiments thereof, many different alterations, modifications and the like will become apparent for those skilled in the art. Also, it should be noted that parts of the system and method may be omitted, interchanged or arranged in various ways, the system and method yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. A method for controlling cooling of a traction battery in an electric vehicle, the method comprising, in a battery cooling control unit:
   determining a battery temperature profile for a segment of a planned route based on route information describing a route from a starting point to a destination and based on a current battery status; and
   determining a battery cooling profile for the segment of the planned route based on the battery temperature profile, wherein determining the battery cooling profile comprises:
      detecting a cooling region in the battery temperature profile where the battery temperature is decreasing without actively cooling the battery; and
      determining the battery cooling profile so that the battery temperature is at a predetermined temperature value when reaching the cooling region.

2. The method according to claim 1, wherein the battery cooling profile is determined to minimize the power required for cooling the battery for the planned route.

3. The method according to claim 1, wherein the predetermined temperature value is higher than a target battery temperature and lower than a maximum allowable battery temperature.

4. The method according to claim 1, wherein the length of the segment is based on speed limits of roads of the route.

5. The method according to claim 1, wherein a length of the segment is based on locations of charging stations along the route.

6. The method according to claim 1, further comprising determining a battery temperature profile and a battery cooling profile for a plurality of segments.

7. The method according to claim 1, wherein the route information comprises information of planned stops.

8. The method according to claim 1, further comprising determining a current battery status by determining a temperature, a state-of-charge, and/or a state-of-health of the battery.

9. The method according to claim 1, further comprising acquiring traffic information and/or weather information for the planned route.

10. The method according to claim 1, wherein the battery cooling profile for the planned route is determined at least partially based on a previously measured battery temperature profile for the same route.

11. The method according to claim 1, wherein a battery cooling profile is determined based on a target temperature and an allowable temperature range.

12. The method according to claim 1, wherein determining a battery temperature profile comprises determining a battery current profile.

13. The method according to claim 1, further comprising detecting a deviation from the planned route and updating the battery cooling profile based on the detected deviation.

14. The method according to claim 1, further comprising, if a measured battery temperature deviates from an expected battery temperature based on the battery temperature profile by more than a predetermined difference value, determining a new battery temperature profile for the current segment.

15. The method according to claim 1, further comprising controlling a battery cooling system based on a determined battery cooling profile.

16. A battery thermal management system control unit configured to perform the method according to claim 1.

17. A battery thermal management system comprising a battery cooling system arranged and configured to cool a traction battery of a vehicle and a battery thermal management system control unit programmed to:
   determine a battery temperature profile for a planned route based on route information describing a route from a starting point to a destination and based on a current battery status; and
   determine a battery cooling profile for the route based on the battery temperature profile, wherein determining the battery cooling profile comprises:
   detecting a cooling region in the battery temperature profile where the battery temperature is decreasing without actively cooling the battery; and determining the battery cooling profile so that the battery temperature is at a predetermined temperature value when reaching the cooling region.

18. The battery thermal management system according to claim 17, wherein the battery thermal management system control unit is further programmed to control the cooling system to cool the battery according to the determined battery cooling profile during the route.

19. A vehicle comprising the battery thermal management system according to claim 17.

\* \* \* \* \*